(No Model.) 2 Sheets—Sheet 1.
F. EGGE.
APPARATUS FOR MOLDING AMBER.
No. 445,284. Patented Jan. 27, 1891.
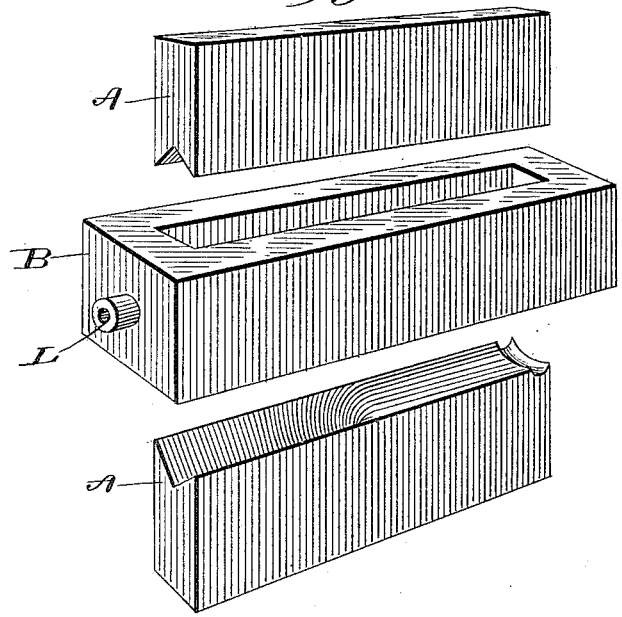
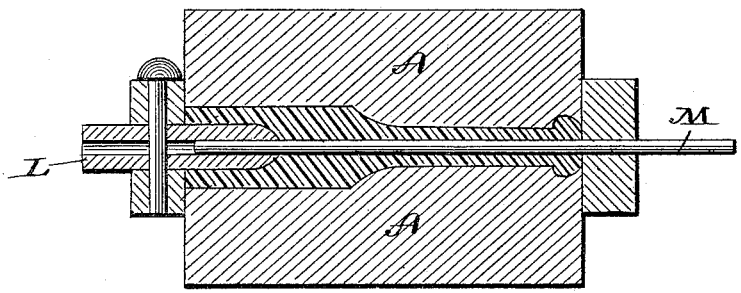
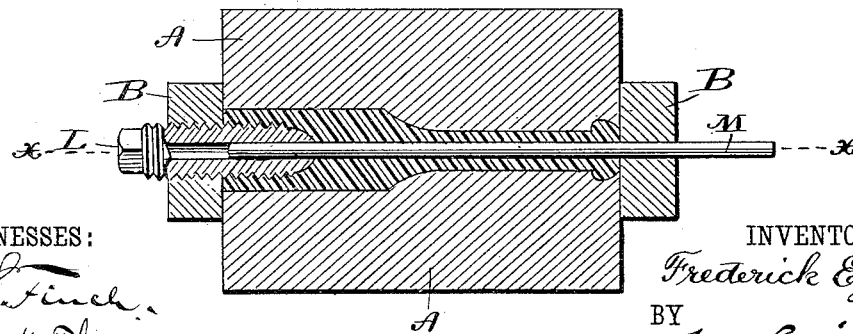
WITNESSES:
J. S. Finch
Ches H. Fleming
INVENTOR
Frederick Egge
BY
F. W. Smith Jr.
ATTORNEY

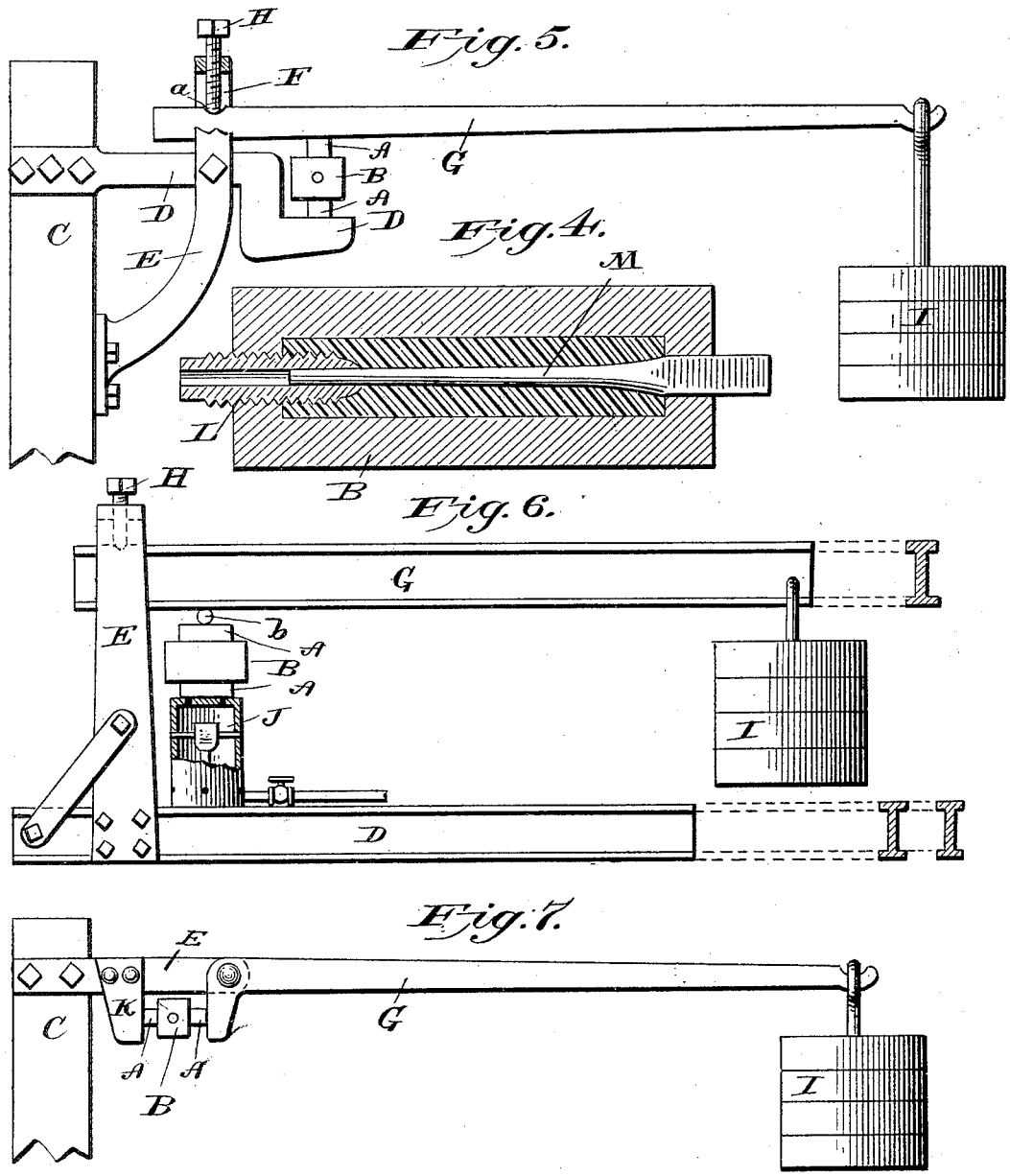

UNITED STATES PATENT OFFICE.

FREDERICK EGGE, OF BRIDGEPORT, CONNECTICUT.

APPARATUS FOR MOLDING AMBER.

SPECIFICATION forming part of Letters Patent No. 445,284, dated January 27, 1891.

Application filed July 26, 1890. Serial No. 360,044. (No model.)

*To all whom it may concern:*

Be it known that I, FREDERICK EGGE, a citizen of the United States, residing at Bridgeport, in the county of Fairfield and State of Connecticut, have invented certain new and useful Improvements in Apparatus for Molding Amber; and I do hereby declare the following to be a full, clear, and exact description of the invention, such as will enable others skilled in the art to which it appertains to make and use the same.

My invention relates to certain new and useful improvements in apparatus for making integral articles from pieces of amber, and has for its object to provide articles from amber cheaply and to afford a product which shall not be inferior to articles cut from a single piece of amber in the usual manner.

In the accompanying drawings, Figure 1 is a perspective of a pair of molds and a mold-box such as I employ in my apparatus; Fig. 2, a vertical section through the molds and box, showing as a molded article a mouthpiece for a cigar; Fig. 3, a view similar to Fig. 2, but showing particularly a threaded plug within the end of the mouth-piece; Fig. 4, a section at the line *x x* of Fig. 3; Fig. 5, an elevation of my improved apparatus, and Figs. 6 and 7 modified forms of said apparatus.

Similar letters denote like parts in the several figures of the drawings.

The molds shown are adapted for the formation of a mouth-piece for a cigar; but they may be of any shape internally, according to the article to be molded; also, I will state that the molds and mold-box are all well known and form no part of my present invention.

A are the molds, and B the mold-box.

C is a post, which is rigidly secured to any suitable base. (Not shown.)

D is a support for the molds and box, said support being secured to the post C. E is a bracket extending from said post and having an opening F through its head, as shown at Fig. 5.

G is a beam, which rests upon the upper mold, the rear end of said beam extending through the opening F and bearing against a bolt H, which passes through the top of the bracket E and rests within a concavity *a* in the upper edge of the beam. For all practical purposes the beam might as well be pivoted within the bracket; but I prefer the construction shown, because I am thereby enabled to establish different normal elevations of the beam according to the different sizes of the molds or mold-boxes. At the outer end of this beam are suspended weights I, by which the pressure on the molds is determined. The molds in proper relation with respect to the mold-box are placed upon the support D, the beam adjusted so that it will rest upon the upper mold, the weights suspended from the end of the beam, and, finally, the heating agent is applied beneath the molds and box in the usual manner. The pressure may be increased or decreased by simply adding or removing weights, and the action of the heat softens or fuses the amber, and thereby causes the molds to be firmly compressed against the amber to shape it as fast as its softened condition will allow.

In Fig. 6 the beam is secured directly within the post, and the under mold is supported directly on a gas-chamber J, which rests on the support D. If desired, a friction-roll *b* may be placed between the beam and upper mold, as seen at Fig. 6. The pressure is due to gravity, and is therefore constant and automatic, while the beam has a free swing on its pivotal point.

In Fig. 7 the bracket E extends straight out from the post C, and the beam is in the shape of an L-lever, pivoted at the angle to said bracket, the molds and box being clamped between the heel of said lever and a shoulder K, secured to said bracket.

By the use of my improved apparatus a constant automatic pressure is obtained, and I am thereby enabled to mold articles having a core therein, as shown in Figs. 2, 3, and 4, and I can readily mold a thread in a piece of amber, and this latter accomplishment has heretofore been essayed, but never before attained.

In making cigar mouth-pieces and analogous articles a core-plug L is inserted through one side of the core-box, and a properly-shaped wire M is extended from said core through the other side of said box. When the molding is completed, the plug and wire are simply withdrawn.

In Fig. 4 the shape of the wire is shown, it being preferable in mouth-pieces for cigars that the opening at the upper end should be flared. It often is essential that the lower end of the mouth-piece should be threaded interiorly, and in Figs. 3 and 4 I have shown the core-plug exteriorly threaded, it being necessary only to unscrew the plug after the molding is completed.

As I have stated, it has never before been considered practical to mold a perfect thread within amber, and the sole reason why I am enabled to do it is that my pressure is constant and never relaxes, whereby the action of the molds is perfect, whereas, if the contraction of the amber caused the latter to draw away from the molds, the threaded portion would quickly become warped and distorted.

I am aware that amber has heretofore been molded into shape by the application of heat and pressure; but in all apparatus which has been employed the pressure has been effected by the manipulation of a screw or cam, and this sort of pressure does not accomplish the results which follow the use of my apparatus.

Having thus described my invention, what I claim as new, and desire to secure by Letters Patent, is—

1. In an apparatus for molding amber, the combination, with the molds containing the amber, of means for heating said molds and means for applying thereto a constant and uniform automatic pressure, substantially as set forth.

2. In an apparatus for molding pieces of amber into a single article, the combination, with the molds containing the amber and means for heating the same, of means for synchronously applying thereto a constant and uniform automatic pressure, substantially as set forth.

In testimony whereof I affix my signature in presence of two witnesses.

FREDERICK EGGE.

Witnesses:
F. W. SMITH, Jr.,
J. S. FINCH.